United States Patent [19]

Malcolm et al.

[11] Patent Number: 5,007,286

[45] Date of Patent: Apr. 16, 1991

[54] SOLID-STATE TRANSDUCER BASED DYNAMIC FLUID FLOW SENSING SYSTEM

[76] Inventors: Robert G. Malcolm, 1849 Watkins Lk. Rd., Pontiac, Mich. 48054; Thomas W. Richardson, 3969 Lakewood, Prayton Plains, Mich. 48020

[21] Appl. No.: 389,123

[22] Filed: Aug. 3, 1989

[51] Int. Cl.$^5$ .............................................. G01G 71/10
[52] U.S. Cl. .................... 73/181; 73/861.47
[58] Field of Search ............ 73/181, 182, 189, 861.47, 73/861.72, 861.71, 861.74, 861.69, 861.73, DIG. 4

[56] References Cited

U.S. PATENT DOCUMENTS

| | | | |
|---|---|---|---|
| 2,315,756 | 4/1943 | Warner | 73/721 |
| 3,084,543 | 4/1963 | Finkl et al. | 73/182 |
| 3,181,356 | 5/1965 | Carpenter | 73/182 |
| 3,349,615 | 10/1967 | Finkl | 73/182 |
| 3,596,513 | 8/1971 | Sandstedt | 73/181 |
| 3,719,078 | 3/1973 | Pastan | 73/181 |
| 3,746,985 | 7/1973 | Perron | 73/181 |
| 3,777,561 | 12/1973 | Lewis | 73/181 |
| 3,782,193 | 1/1974 | Meyer et al. | 73/181 |
| 3,978,725 | 9/1976 | Haytke | 73/182 |
| 4,068,206 | 1/1978 | Popp | 338/36 |
| 4,070,909 | 1/1978 | Carpenter | 73/182 |
| 4,163,396 | 8/1979 | Waugh | 73/721 |
| 4,205,552 | 6/1980 | Refoy | 73/182 |
| 4,226,125 | 10/1980 | Waugh | 73/708 |
| 4,271,700 | 6/1981 | Tschanz et al. | 73/182 |
| 4,759,216 | 7/1988 | Carpenter et al. | 73/182 |
| 4,809,547 | 3/1989 | Warrow | 73/183 |
| 4,821,567 | 4/1989 | Nakamura et al. | 73/182 |

FOREIGN PATENT DOCUMENTS 0010783 1/1977 Japan ................................ 73/186

OTHER PUBLICATIONS

IC Sensors—Model 84 Promotional Literature (Publication Date Unknown).
IC Sensors—Application Note Dated Mar. 1985.

*Primary Examiner*—Donald O. Woodiel
*Attorney, Agent, or Firm*—Basile and Hanlon

[57] ABSTRACT

A dynamic fluid flow sensing system measures relative fluid velocity with respect to a reference member. The system includes a sensor housing supported from the reference member such that the sensor housing is exposed to fluid flowing past the reference member. A solid-state pressure sensing transducer is supported by the sensor housing for generating an electronic output signal in proportion to a sensed dynamic pressure of fluid flowing past the reference member. A central processing unit receives the electronic output signal from the transducer and generates a processed electronic output signal in accordance with a stored control program. A display receives the processed electronic output signal and displays a visual readout of desired fluid flow characteristics based on the processed electronic output signal. The dynamic fluid flow sensing system can be used on marine vessels to indicate vessel speed or in confined fluid flow passages to indicate flow characteristics such as pressure, velocity and/or flow rate.

23 Claims, 3 Drawing Sheets

SOLID-STATE TRANSDUCER BASED DYNAMIC FLUID FLOW SENSING SYSTEM

FIELD OF THE INVENTION

The invention relates to a flow-meter apparatus for measuring relative fluid velocity, and more particularly, to a marine speedometer instrument used in the measurement of a marine vessel's speed, and a dynamic fluid flow measuring instrument used in the measurement of confined fluid flow characteristics such as pressure, velocity and/or flow rate.

BACKGROUND OF THE INVENTION

Typically, marine speedometer systems use either pitot tube or paddle wheel type devices to measure vessel speed. The pitot tube senses stagnation pressure as a function of speed, while the paddle wheel supplies output pulses that are counted to indicate speed. The devices are usually mounted on the stern or the bottom of the vessel. It is common in the arm to provide redundant marine speedometer systems as a backup for accuracy or dependability. Unfortunately, there are times when both the primary and redundant marine speedometer systems are inoperative. Problems occur most frequently when using a pitot tube on weedy inland lakes. When the pitot tube is partially clogged or blocked by weeds or other debris, a lower than actual speed will be indicated by the marine speedometer system. The paddle wheel devices experience problems in the form of mechanical wear, corrosion and inaccuracy due to rotational resistance.

SUMMARY OF THE INVENTION

To overcome all of the perceived disadvantages of the present systems discussed above, the present invention of a marine speedometer system uses a completely solid state pressure sensor. While the intended use of this system is to measure vessel speed relative to the unconfined media, such a system could also be used to measure confined flow, such as media flowing through ducts, pipes, conduits or the like.

The sensor used in the present invention is normally used to measure hydrostatic pressure. In order to adapt the sensor for use in measuring dynamic fluid pressure relative to an unconfined media, the sensor is uniquely mounted into a specifically shaped holder referred to herein as a transducer assembly. The assembly is fastened to the boat stern such that the sensor is slightly below the boat bottom. The holder is designed to maximize dynamic pressure sensitivity by resolving the largest pressure component possible, while minimizing drag, fluid spray and any tendency to catch debris. While this particular design does not preclude other mounting techniques with similar advantages, it does allow for immediate original equipment manufacture applications as well as after market applications with minimum vessel modifications.

As fluid pressure is applied to the sensor diaphragm, this action causes an internal pressure transfer to a piezoresistive element via a coupling fluid, with virtually no physical movement, thus removing any mechanical criticality. The assembly could be hinged at the attachment so as to be tripped up at a predetermined force to prevent transducer assembly or vessel damage upon contact with debris, or during shipping or trailering.

The holder is designed to house the sensor such that the sensor leads or connections are isolated from the fluid. A spanner nut is used to compress an O-ring between the sensor and the holder, thereby creating a water tight seal and precluding the use of screws or other protrusions that could catch weeds or other debris. Other mounting options include injection molding the sensor with its wires and connectors in place, or molding the housing in two halves, pressing the two halves together and sonically sealing the sensor in between. In any case, the sensor wires can be brought out of the holder directly and passed through the transom or passed through a bulkhead connector integrated into the hinge attachment.

Electronic circuity supplies the proper signals and power to the sensor, and converts the sensor output to an electronic signal suitable for further processing. Central processing means converts the electronic signal, as provided by the electronic circuitry, to a value of speed. In determining the value of speed, the central processing means interprets the dynamic pressure characteristics of the pressure sensor assembly as a function of vessel speed.

The central processing means may also use the following inputs as information to further enhance system accuracy and flexibility. The vessel inclination, i.e., vessel pitch or angle of attack, can be used as an additional input to further enhance system accuracy and flexibility. In this configuration, vessel inclination is provided to the central processing means by an inclination sensor that is used, along with other possible inputs, to give an accurate measure of vessel speed that is independent of vessel inclination. Vessel configuration or hull-shape compensation, particularly transom angle, can also be used as an additional input to further enhance system accuracy and flexibility. Sensor pressure, and therefore speed values, may be influenced by the particular hull shape or vessel configuration on which it is installed. Combinations such as engine option, seating arrangement, transom angle or load bias characteristics are some of the possible configurations. The system may be mechanically or electronically pre-set at the factory or dealer to conform to the particular vessel hull shape configuration. Electronically variable speed adjustment may also be used as an additional input to further enhance system accuracy and flexibility. The vessel operator may have the option to adjust the displayed speed to compensate for water conditions that may affect sensor pressure at a given speed. This may also be done to set the vessel speed as a function of a ski course length for consistency among vessels during the same competition skiing event. Water density and/or temperature may also be used as an additional input to further enhance the system accuracy and flexibility. These inputs may be provided to the central processing units by respective density and temperature sensors, combined with other appropriate inputs and used by the control program in the central processing unit to determine a compensated vessel spaced such that accurate vessel speed is independent of variations in fluid density or temperature.

The central processing unit will also control the display device electronics with software designed to display the values of speed in a smooth, easily readably manner. The display device can indicate the speed value by means of digits, bar graphs, needles or other means based on various display technologies such as light emitting diodes, vacuum fluorescent, liquid crystal or the like.

The present invention provides a system for the accurate measurement and display of marine vessel speed. The system is designed to operate in all marine media or waterways without being affected by weeds or debris common to waterways. The system consists of a solid state pressure sensor to monitor the dynamic pressure applied to the sensor due to vessel movement, electronic logic to convert the sensor output to an electronic signal, a microprocessor or other central processing means to convert this electronic signal to a value of speed, and additional electronic circuitry and display devices to display speed value to the vessel operator.

Other objects and features of the invention will become apparent by reference to the following specification and to the drawings.

DESCRIPTION OF THE PREFERRED EMBODIMENT

Figure 1:
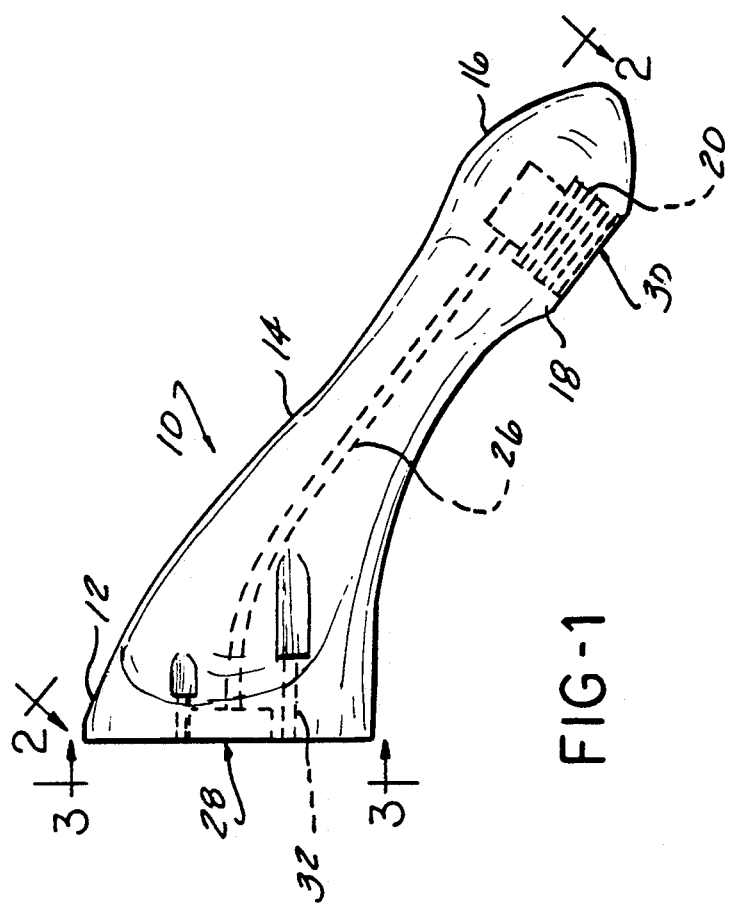
FIG. 1 is a side elevational view of the sensor housing means in accordance with the present invention.
Figure 2:
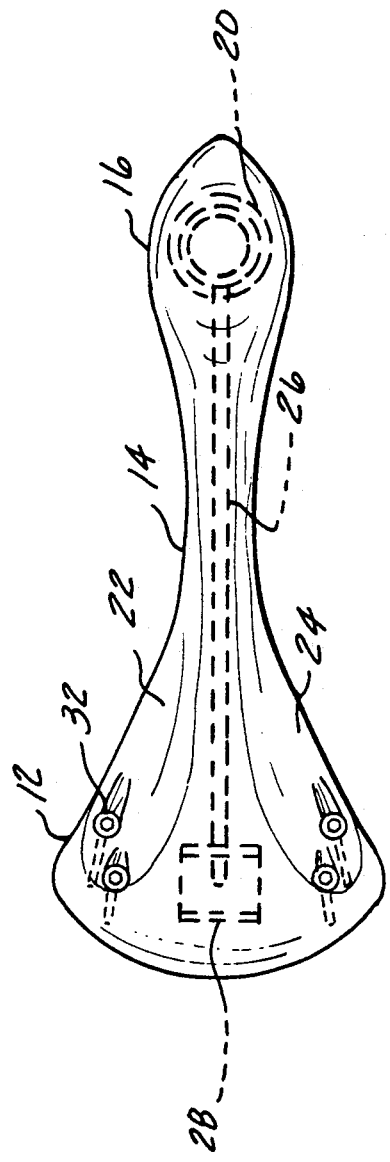
FIG. 2 is a top view of the sensor housing means taken as shown in FIG. 1.
Figure 3:
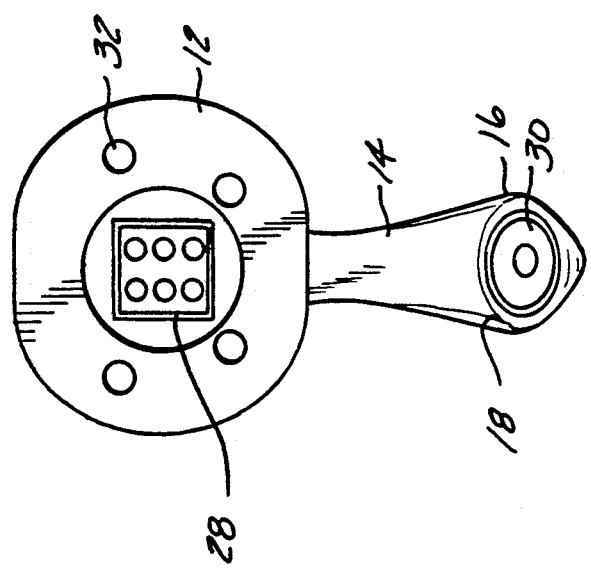
FIG. 3 is an end elevational view taken as shown in FIG. 1.

The present invention is a marine speedometer system for measuring relative fluid velocity in an unconfined media to indicate speed of a vessel. The marine speedometer system includes sensor housing means, designated generally 10, supported from the vessel such that the sensor housing means is exposed to fluid flowing past the vessel. The sensor housing means 10 is best seen in FIGS. 1-3. The sensor housing means 10 preferably includes an enlarged base portion 12 for connection to the stern or transom of a vessel, preferably through a hinged attachment means (not shown) which can be tripped up at a predetermined force to prevent sensor assembly or vessel damage on contact with debris or during shipping or trailering of the vessel. The sensor housing means 10 also includes a tapered middle portion 14 extending outwardly and angularly downward with respect to the stern of transom of the vessel. An enlarged end portion 16 of the sensor housing means 10 includes a forward facing surface 18 having an aperture 20 formed therein. Preferably, the sensor housing means 10 has a generally triangular cross section formed by the forward facing surface 18 and two surfaces, 22 and 24 respectively, tapering toward one another as best seen in FIG. 2. The edges of the sensor housing means 10 are rounded and smooth providing an aerodynamic housing with a minimum amount of fluid drag resistance. A passage 26 communicates between the aperture 20 in the end portion 16 of the sensor housing means 10 and an electrical connector 28 disposed in the enlarged base portion 12 of the sensor housing means 10 allowing connection of wires between the electrical connector 28 and the dynamic pressure sensing transducer means 30 disposed in the aperture 20. Apertures 32 can be formed in the enlarged base portion 12 of the sensor housing means 10 for passage of screws or bolts to connect the sensor housing means 10 to a hinged attachment assembly connected to the stern of the vessel.

The solid-state pressure sensing transducer means 30 are commercially available from IC Sensors located in Milpitas, Calif. The Model 84 sensor is a media compatible, solid-state pressure sensor that is intended for use in original equipment manufactures application where long term stability is desired combined with low cost. The stainless steel housing structure uses silicon oil to couple a diffused, piezoresistive sensor to a convoluted, flush stainless steel diaphragm that can be interfaced with most harsh media. The Model 84 is designed to be mounted using an O-ring as a face seal or a bore seal to maintain pressure integrity. Integral temperature compensation is provided along with calibration over 0° to 50° C. with laser trimmed resistors. No external resistors are required. An additional laser trimmed resistor is included to normalize pressure sensitivity variations by programming the gain of an external amplifier, thus providing ±1% interchangeability along with high level output.

Figure 4:
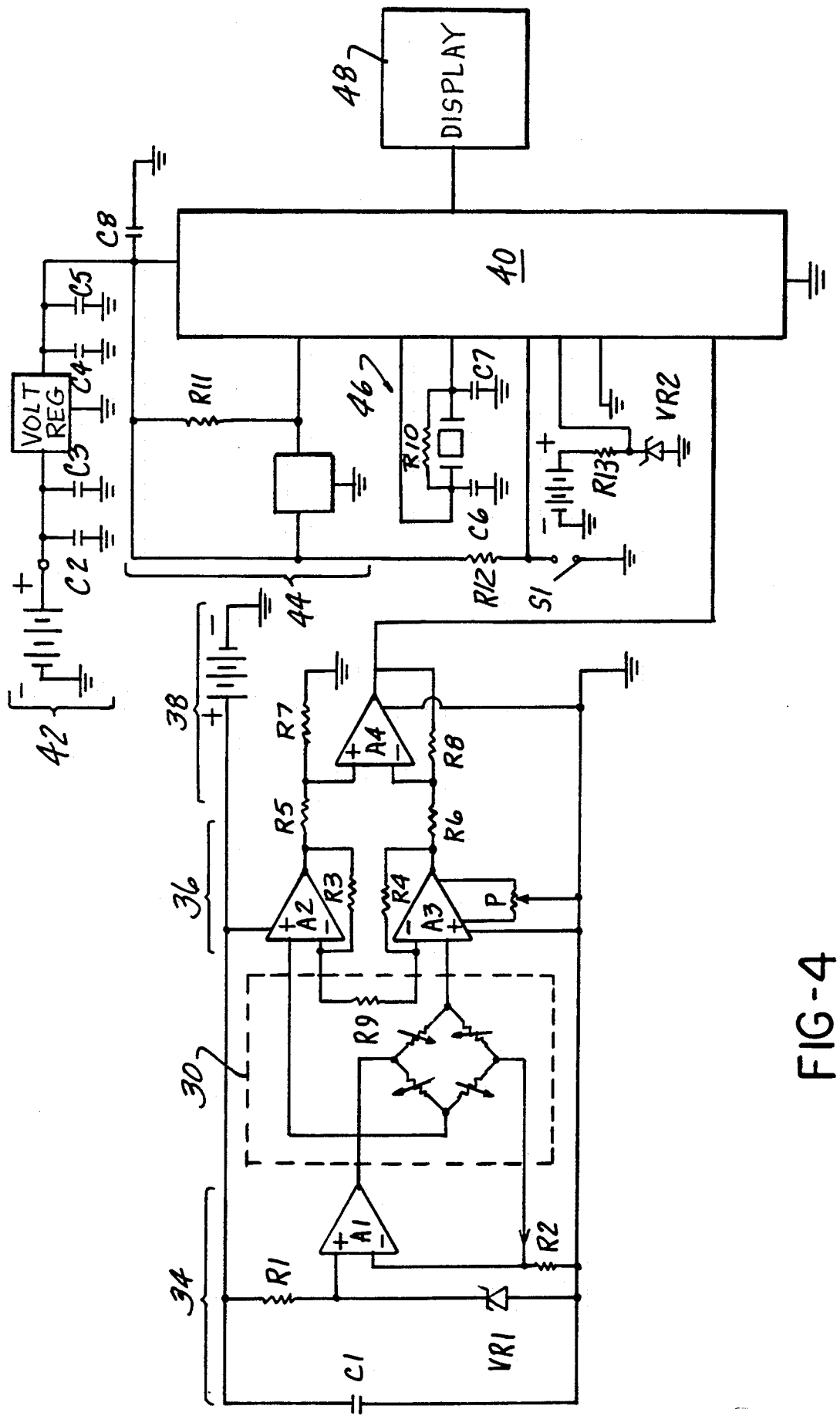
FIG. 4 is an electrical schematic diagram for a marine speedometer system according to the present invention.

A schematic diagram of the electrical circuitry of the present invention is best seen in FIG. 4. The dynamic pressure sensing transducer means 30 is connected to a precision constant current source 34 for sensor excitation and to an instrumentation differential amplifier 36 with the gain programmed by sensor feedback resistor R9. It should be recognized that circuit modifications could be made to obtain outputs other than 0 to 5 volts as used in the present invention. The current source 34 is controlled by the ±1% band-gap reference diode VR. Selecting amplifier A1 with an offset voltage below 1 mV and a ±1% tolerance of resistor R2 delivers current with typical accuracy of ±10.8%. The first differential stage of the instrumentation amplifier 36, i.e., A2 and A3, has a zeroing potentiometer P. For OP227 amplifiers A2 and A3, the zero range is typically ±4 mV in reference to the input with a differential offset below 0.5 mV. This leaves approximately ±3.5 mV zeroing range for the compensation of the sensor offset which typically is below ±1 mV. The second stage of the amplifier 38, i.e., A4 provides additional amplification and translates the differential floating voltage from the first stage into a single ended output voltage.

The overall accuracy of the span voltage is affected by the accuracy of feedback resistors R3 through R8. Using ±0.1% resistors, such as Mepco/Electra 5063Z, a typical gain error will be about ±0.24%. The accuracy error may be decreased when matched thin film resistors are used, such as Beckman 694-3-A. The combined span error of the entire signal conditioning circuit at a reference temperature will then by typically about 1.1%. without any adjustment or pressure testing. This will be superimposed on the sensor's accuracy of ±1%. If additional calibration and normalization is desired, resistor R2 can be replaced with a series combination of a potentiometer and a resistor. The potentiometer can be adjusted to set the bridge excitation current to achieve the exact span voltage with full scale pressure applied to the sensor.

The output from the single ended amplifier A4 is fed to a central processing unit, for example a microcontroller 40, such as a Motorola MC68HC805B6. A low voltage regulator 42 maintains voltage to the microcontroller 40 at preferably 5 volts. A low voltage detection circuit 44 monitors the voltage and if the voltage is low automatically resets the microcontroller 40 until the voltage comes back up to an acceptable level. A crystal oscillator clock 46 provides base timing for the microcontroller 40 and associated circuitry. A scale conversion input switch S1 allows the microcontroller 40 to convert between desired scales, such as miles per hour to knots. Switch S1 supplies voltage to the microcontroller 40 for one scale and connects to ground for a different scale. A precision voltage reference means formed by R13 and VR2 provides a 5.0 volt reference to the analog to digital converter in the microcontroller.

The display means 48 can be a liquid crystal display, such as a Hitachi Model No. HI333C-C for receiving the processed electronic output signal from the central processing means 40 and for displaying a visual readout of vessel speed based on the processed electronic output signal. In the alterative, the display means 48 can include a vacuum fluorescent display, a dial with electronically driven mechanical pointer, such as an aircore speedohead display driven by a frequency output from the central processing means 40, or a light emitting diode display driven as a function of a 0-5 volt output directly from the pressure sensing transducer amplifier.

Figure 5:
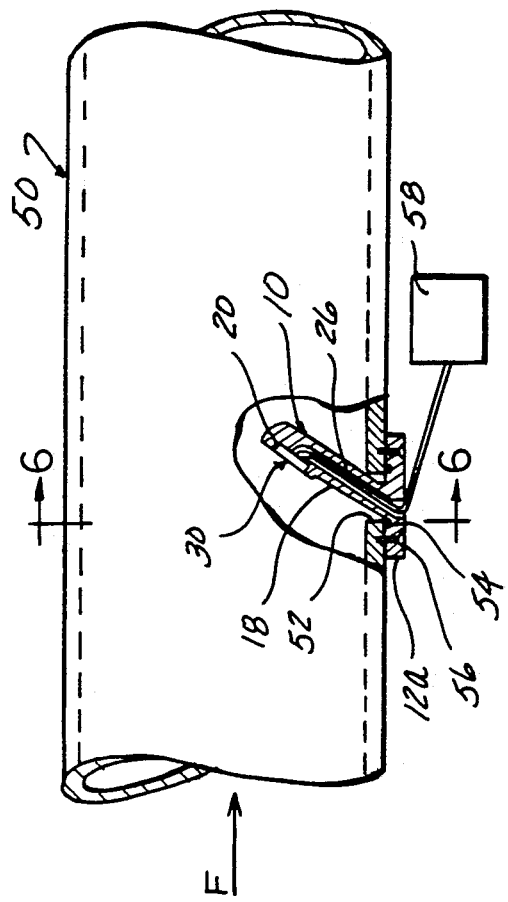
FIG. 5 is a partial cutaway view of another embodiment of the present invention used to measure confined flow, such as fluid media flowing through pipes.
Figure 6:
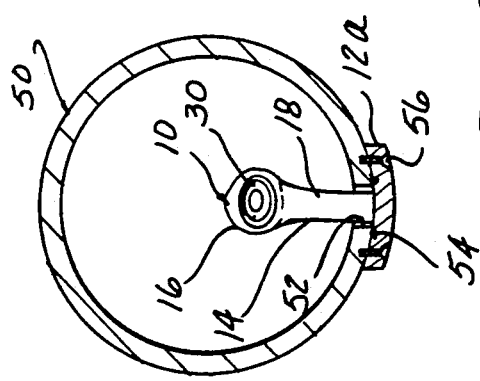
FIG. 6 is a cross-sectional view taken as shown in FIG. 5.
Figure 7:
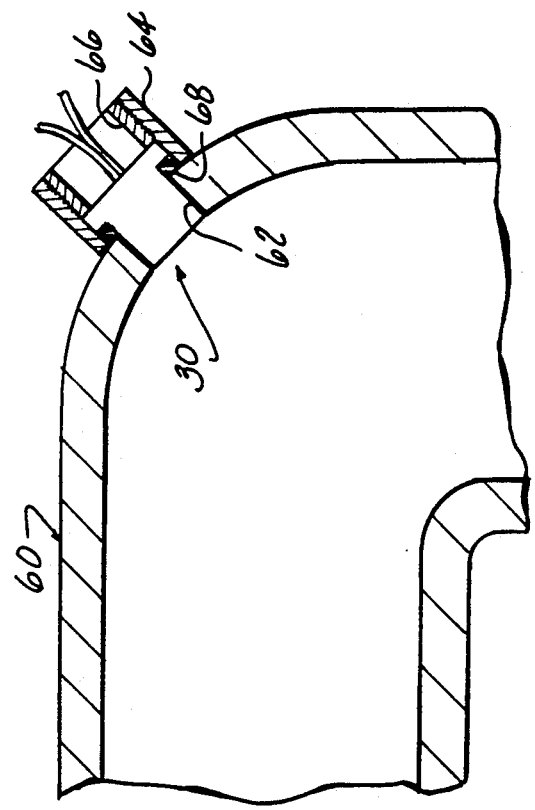
FIG. 7 is a cross-sectional view of the fluid sensor mounted on a pipe elbow.

Referring now to FIGS. 5-7, the system can also be used to measure confined flow, such as media flowing through ducts, pipes, conduits or the like. The sensor housing means 10 can be adapted for use in a straight pipe section 50 as shown in FIGS. 5 and 6. An aperture 52 is formed in a side wall of the pipe 50 allowing insertion of the sensor housing 10 within the interior of the pipe 50. The enlarged base portion 12a in this embodiment takes the form of an arcuate cover plate matingly engageable with the exterior surface of the pipe 50. A seal ring 54 is disposed between the arcuate plate 12a and the exterior surface of the plate 50 to seal the opening against any leakage from the interior of the pipe 50 to the exterior. Fastening means 56 secures the arcuate plate 12a to the pipe 50 and compresses the O-ring seal 54. The sensor housing means 10 also includes a tapered middle portion 14 extending inwardly and angularly with respect to the pipe 50. The sensor housing means 10 is preferably disposed at an obtuse angle with respect to the direction of fluid from flow F as best shown in FIG. 5. An enlarged end portion 16 of the sensor housing means 10 includes a forward facing surface 18 having an aperture 20 formed therein. In its preferred form, the sensor housing means 10 has a generally triangular cross-section formed by the forward facing surface 18 and two other surfaces tapering toward one another in the downstream direction. The edges of the sensor housing means 10 in this embodiment are rounded and smooth providing an aerodynamic housing with a minimum amount of fluid drag resistance. A passage 26 communicates between the aperture 20 in the end portion 16 of the sensor housing means 10 and through the enlarged base portion 12a allowing connection of wires between the dynamic pressure sensing transducer means 30 disposed in the aperture 20 and the associated electrical circuitry designated generally as 58 in FIG. 5. The electrical circuitry 58 can best be seen in FIG. 4. The dynamic pressure sensing transducer means 30 in this embodiment is similar to that previously described for use on marine vessels.

As best seen in FIG. 7, in applications where it is desirable to eliminate any internal pipe obstructions, the dynamic pressure sensing transducer means 30 can be disposed in the outer radial side wall of a pipe elbow 60. An aperture 62 is formed in the outer radial side wall of the pipe elbow 60 allowing the insertion of the dynamic pressure sensing transducer means 30 to a position relatively flush with respect to the interior surface of the pipe elbow 60. A short pipe section 64 is fixedly secured to the outer side wall of the pipe elbow 60 by means such as welding or suitable adhesive or the like. The short pipe section 64 has an internal thread permitting a locking member 66 to be threadingly engaged within the pipe section 64. The locking member 66 engages an external surface of the dynamic pressure sensing transducer means 30 to compress an O-ring seal 68 between the dynamic pressure sensing transducer means 30 and the exterior surface of the pipe elbow 60.

When using the present invention to measure confined flow, such as that shown in FIGS. 5-7, the central processing unit can be used to provide an appropriate processed electronic output signal to display values such as pressure, velocity, or flow within the pipe line. Additional input or calibrations would be provided to indicate the size and type of pipe or conduit, as well as information regarding the fluid flow characteristics of the media being transported through the pipe or conduit.

While the above embodiments of the invention has been described in detail, it will be apparent to those skilled in the art that the disclosed invention may be modified without departing from the scope of the invention. Therefore, the foregoing description is to be considered exemplary rather than limiting, and the true scope of the invention is that defined in the following claims.

What is claimed is:

1. A system for measuring relative fluid velocity with respect to a marine vessel, the system comprising:
   solid-state pressure sensing transducer means for generating an electronic output signal in proportion to a sensed dynamic pressure of flowing fluid with respect to said marine vessel;
   sensor housing means connected to said marine vessel, said sensor housing means having a forwardly facing external surface generally opposed to a direction of fluid flow supporting at least a portion of said transducer means such that said solid-state pressure sensing transducer means is generally flush with the forwardly facing external surface and directly exposed to fluid flowing past said marine vessel; and
   central processing means for receiving said electronic output signal from said transducer means and for generating a processed electronic output signal in accordance with a control program stored in memory.

2. A system for measuring relative fluid velocity with respect to a marine vessel, the system comprising:
   solid-state pressure sensing transducer means for generating an electronic output signal in proportion to a sensed dynamic pressure of flowing fluid with respect to said marine vessel;
   sensor housing means connected to said marine vessel, said sensor housing means having a forwardly facing external surface generally opposed to a direction of fluid flow supporting at least a portion of said transducer means such that said solid-state pressure sensing transducer means is generally flush with the forwardly facing external surface and directly exposed to fluid flowing past said marine vessel;

central processing means for receiving said electronic output signal from said transducer means and for generating a processed electronic output signal in accordance with a control program stored in memory; and display means for receiving said processed electronic output signal and for displaying a visual readout of vessel speed based on said processed electronic output signal.

3. The system of claim 2, wherein said central processing means comprises:

a central processing unit;

low voltage regulator means for supplying constant voltage to said central processing unit;

low voltage detection and reset means for protecting said central processing unit against low voltage by holding said central processing unit in a reset condition during low voltage detection;

crystal oscillator clock means for providing base timing for said central processing unit;

scale conversion means for changing said processed electronic output signal to reflect a different scale reading to be displayed; and precision voltage reference means to allow the central processing unit to accurately read said electronic output signal independent of any voltage regulator variation.

4. The system of claim 2, wherein said display means is selected from a group consisting of a liquid crystal display, a vacuum fluorescent display, a light emitting diode display, a dial with an electronically driven mechanical pointer driven by said processed electronic output signal from said central processing means.

5. A system for measuring relative fluid velocity with respect to a marine vessel, the system comprising:

solid-state pressure sensing transducer means for generating an electronic output signal in proportion to a sensed dynamic pressure of flowing fluid with respect to said marine vessel; and sensor housing means connected to said marine vessel, said sensor housing means supporting said transducer means such that said solid-state pressure sensing transducer means is exposed to fluid flowing past said marine vessel, wherein said sensor housing means includes an elongated housing having an enlarged base portion connected to said marine vessel, a generally triangular shaped cross-sectional middle portion protruding outwardly and downwardly from the base portion with a first surface of said middle section facing forwardly toward a bow of said marine vessel, and an enlarged generally tear-drop shaped end portion having an aperture formed in a forwardly facing surface contiguous with said first surface for receiving said transducer means, said housing having trailing edges tapering off away from said forwardly facing surface.

6. A system for measuring relative fluid velocity with respect to a marine vessel, the system comprising:

solid-state pressure sensing transducer means for generating an electronic output signal in proportion to a sensed dynamic pressure of flowing fluid with respect to said marine vessel;

wherein said solid-state pressure sensing transducer means comprises:

a piezoresistive transducer sensor for sensing dynamic pressure;

constant current source means for exciting said piezoresistive transducer sensor;

differential amplifier means for amplifying a difference between two input signals from said piezoresistive transducer sensor into a differential floating output signal; and single ended amplifier means for translating said differential floating output signal into a single output signal with reference to a ground; and sensor housing means connected to said marine vessel, said sensor housing means having a forwardly facing external surface generally opposed to a direction of fluid flow supporting at least a portion of said transducer means such that asid solid-state pressure sensing transducer means is generally flush with the forwardly facing external surface and directly exposed to fluid flowing past said marine vessel.

7. A system for measuring relative fluid velocity with respect to a fluid passage having an outer wall, the system comprising:

solid-state pressure sensing transducer means for generating an electronic output signal in proportion to a sensed dynamic pressure of flowing fluid with respect to said transducer means;

sensor housing means connected to said outer wall, said sensor housing means having a surface generally opposed to a direction of fluid flow supporting at least a portion of said transducer means, such that said solid-state pressure sensing transducer means is generally flush with the surface and directly exposed to fluid flowing within said fluid passage; and central processing means for receiving said electronic output signal from said transducer means and for generating a processed electronic output signal in accordance with a control program stored in memory.

8. A system for measuring relative fluid velocity with respect to a fluid passage having an outer wall, the system comprising:

solid-state pressure sensing transducer means for generating an electronic output signal in proportion to a sensed dynamic pressure of flowing fluid with respect to said transducer means;

sensor housing means connected to asid outer wall, said sensor housing means having a surface generally opposed to a direction of fluid flow supporting at least a portion of said transducer means, such that said solid-state pressure sensing transducer means is generally flush with the surface and directly exposed to fluid flowing within said fluid passage;

central processing means for receiving said electronic output signal from said transducer means and for generating a processed electronic output signal in accordance with a control program stored in memory; and display means for receiving said processed electronic output signal and for displaying a visual readout of a desired fluid flow characteristic based on said processed electronic output signal.

9. The system of claim 8, wherein said central processing means comprises:

a central processing unit;

low voltage regulator means for supplying constant voltage to said central processing unit;

low voltage detection and reset means for protecting said central processing unit against low voltage by holding said central processing unit in a reset condition during low voltage detection;

crystal oscillator clock means for providing base timing for said central processing unit;

scale conversion means for changing said processed electronic output signal to reflect a different scale reading to be displayed; and precision voltage reference means to allow the central processing unit to accurately read said electronic output signal independent of any voltage regulator variation.

10. The system of claim 8 wherein said display means is selected from a group consisting of a liquid crystal display, a vacuum fluorescent display, a light emitting diode display, a dial with an electronically driven pointer driven by said processed output signal from said central processing means.

11. A system for measuring relative fluid velocity with respect to a fluid passage having an outer wall, the system comprising:

solid-state pressure sensing transducer means for generating an electronic output signal in proportion to a sensed dynamic pressure of flowing fluid with respect to said transducer means; and sensor housing means connected to said outer wall, said sensor housing means supporting said transducer means such that said solid-state pressure sensing transducer means is exposed to fluid flowing within said fluid passage, wherein said sensor housing means includes an elongated housing having an enlarged base portion connected to said fluid passage, a middle portion protruding inwardly toward a center line of said fluid passage, and an enlarged end portion having an aperture formed in an upstream facing surface for receiving said transducer means.

12. A system for measuring relative fluid velocity with respect to a fluid passage having an outer wall, the system comprising:

solid-state pressure sensing transducer means for generating an electronic output signal in proportion to a sensed dynamic pressure of flowing fluid with respect to said transducer means wherein said solid state pressure sensing transducer means comprises:

a piezoresistive transducer sensor for sensing dynamic pressure;

constant current source means for exciting said piezoresistive transducer sensor;

differential amplifier means for amplifying a difference between two input signals from said piezoresistive transducer sensor into a differential floating output signal; and single ended amplifier means for translating said differential floating output signal into a single output signal with reference to a ground; and sensor housing means connected to said outer wall, said sensor housing means having a surface generally opposed to a direction of fluid flow supporting at least a portion of said transducer means, such that said solid-state pressure sensing transducer means is generally flush with the surface and directly exposed to fluid flowing within said fluid passage.

13. The system of claim 12 further comprising display means for receiving said electronic output signal and for displaying a visual readout of a desired fluid flow characteristic based on said electronic output signal.

14. The system of claim 12, wherein said surface of said sensor housing means is a sensor housing protruding inwardly toward a center line of said fluid passage.

15. A system for measuring relative fluid velocity comprising the steps of:

sensing dynamic fluid pressure with a solid-state transducer connected to a relative reference member and exposed to fluid flowing past said relative reference member, said solid-state transducer mounted generally flush with respect to a surface of said relative reference member generally opposed to a direction of fluid flow and directly exposed to said flowing fluid;

generating an electronic output signal from said transducer in proportion to the sensed dynamic pressure;

sending said electronic output signal to a central processing unit;

generating a processed electronic output signal in accordance with a control program stored in memory of said central processing unit; and displaying a visual readout of a desired fluid flow characteristic based on said processed electronic output signal.

16. The method of claim 15, wherein said relative reference member comprises a marine vessel in an unconfined media.

17. The method of claim 15, wherein said relative reference member comprises a fluid passage with fluid flowing confined within said fluid passage.

18. A system for measuring relative fluid velocity comprising the steps of:

sensing dynamic fluid pressure with a solid-state transducer connected to a relative reference member and exposed to fluid flowing past said relative reference member, wherein said relative reference member comprises a marine vessel in an unconfined media;

generating an electronic output signal from said transducer in proportion to the sensed dynamic pressure;

sending said electronic output signal to a central processing unit;

generating a processed electronic output signal in accordance with a control program stored in memory of said central processing unit;

displaying a visual read out of a desired fluid flow characteristic based on said processed electronic output signal;

sensing inclination of said marine vessel in said unconfined media with an inclinometer mounted on said marine vessel;

sending an electronic signal to said central processing unit from said inclinometer; and compensating for marine vessel inclination on said sensed dynamic pressure prior to displaying said visual readout.

19. A system for measuring relative fluid velocity with respect to a relative reference member comprising:

solid-state transducer means for sensing dynamic fluid pressure, said transducer means connected to said relative reference member having at least a portion of said solid-state transducer means mounted generally flush with respect to a surface of said relative reference member generally opposed to a direction of fluid flow and directly exposed to fluid flowing past said relative reference member, said transducer means generating an electronic output signal in proportion to sensed dynamic pressure;

central processing means for receiving said electronic output signal form said transducer means and for generating a processed electronic output signal in accordance with a control program stored in memory; and display means for receiving said processed electronic output signal and for displaying a visual readout of a desired fluid flow characteristic based on said processed electronic output signal.

20. The system of claim 19, wherein said relative reference member comprises a marine vessel in an unconfined media.

21. The system of claim 19, wherein said relative reference member comprises a fluid passage with fluid flowing confined within said fluid passage.

22. A system for measuring relative fluid velocity with respect to a fluid passage having an outer wall, the system comprising:

solid-state pressure sensing transducer means for generating an electronic output signal in proportion to a sensed dynamic pressure of flowing fluid with respect to said transducer means; and sensor housing means connected to said outer wall, said outer wall having an inner surface generally opposed to a direction of fluid flow supporting at least a portion of said transducer means, such that said solid-state pressure sensing transducer means is generally flush with the inner surface and directly exposed to fluid flowing within said fluid passage.

23. A system for measuring relative fluid velocity with respect to a marine vessel, the system comprising:

solid-state pressure sensing transducer means for generating an electronic output signal in proportion to a sensed dynamic pressure of flowing fluid with respect to said marine vessel; and sensor housing means connected to said marine vessel, said sensor housing means having a forwardly facing external surface generally opposed to a direction of fluid flow supporting at least a portion of said transducer means such that said solid-state pressure sensing transducer means is generally flush with the forwardly facing external surface and directly exposed to fluid flowing past said marine vessel, wherein said sensor housing means includes, an elongated housing having a base portion connected to said marine vessel, a narrowed middle portion extending outwardly and downwardly from the base portion, and an end portion enlarged sufficiently to support at least a portion of said transducer means having a surface generally opposed to a direction of fluid flow, said portion of said transducer means disposed generally flush with said surface of said end portion and directly exposed to fluid flowing past said marine vessel.

* * * * *